Patented Oct. 3, 1950

2,524,672

UNITED STATES PATENT OFFICE 2,524,672

PREPARATION OF SALTS OF PHTHALOCYANINE PIGMENTS

Hans Z. Lecher, Plainfield, Robert E. Brouillard, Bound Brook, and Vito A. Giambalvo, Somerville, N. J., assignors to American Cyanamid Company, New York, N. Y., a corporation of Maine No Drawing. Application September 2, 1948, Serial No. 47,544

11 Claims. (Cl. 260—314.5)

This invention relates to a new process for making salts of tetrabenzotetrazaporphine pigments which are commonly known as phthalocyanines. In the more specific aspect, the invention relates to a process in which the salts are then hydrolyzed to produce flocculation resistant pigments.

The phthalocyanine pigments have many important technical advantages and are outstanding in many of their pigmentary properties. However, when the pigments are used under conditions which permit flocculation, particularly when used in coating compositions, a serious disadvantage arises.

The drying of coating compositions containing phthalocyanine pigments often results in a lack of uniformity of dispersion of the pigment present. This lack of dispersion appears to be caused by flocculation of the pigment particles and a dry film is often characterized by a non-uniform, mottled effect. This affects adversely the glass, smoothness, and color value of the coating.

Coating compositions containing nitrocellulose exert a particularly undesirable effect on ordinary phthalocyanine pigments. Unfortunately, many of the important coating compositions of commerce include nitrocellulose so that the difficulties due to flocculation represent a serious practical problem.

Not only is there a tendency for the pigment particles to flocculate and give non-uniform results, but the degree of flocculation of the same coating composition is not constant with different methods of application. For example, when the coating composition is sprayed on to an object, the flocculation is much less than when the object is dipped in the same coating composition. In the latter case, the pigment appears weaker tinctorially and duller in shade. Unfortunately, in a number of practical applications, some parts of an object may be sprayed and others dipped.

In referring to the term "flocculation," we are dealing with the gross results. It is known that the pigment particles do coalesce or flocculate. Just why they behave in this manner has not been fully determined. However, the degree of flocculation can be accurately measured by various means, some of which are described in United States Patent 2,327,472. A very satisfactory method of quantitative measurement of the degree of flocculation is by means of a recording spectrophotometer. For example, glass holders may be coated, one by spraying and the other by dipping. The holders should be designed to eliminate specular reflection as is described in United States Patent 2,364,825. The measurement of the strength of color by the spectrophotometer will then give a numerical measure of the degree of flocculation, or rather the loss in color value resulting from the flocculation. Tests of a typical nitrocellulose lacquer formulation using flocculating copper phthalocyanine as the pigment may show 30-35% weaker color for the poured sample than the sprayed sample. In the spraying, of course, there is probably re-dispersion of the flocculated or coalesced pigment particles.

In the past, many attempts have been made to solve the problem of flocculation of phthalocyanine pigments. Some of these proposals involve coating the pigment with a coating agent such as, for example, aluminum benzoate. This method suffers from the serious disadvantage that the resulting product contains a smaller amount of color because of the rather large amounts of the added material and the added material may in some cases be reactive and adversely affect the properties of the finished coating composition.

It has also been proposed to add certain dispersing agents during the conditioning of the pigment prior to incorporation into a coating composition. This method also suffers from the disadvantage that foreign matter is permanently incorporated with the pigment and the solution is, therefore, not completely satisfactory practically.

So serious has the flocculation problem been in the past that in many cases it has been avoided by using some derivatives of phthalocyanines which do not flocculate. This method of solution, however, closes the field to the use of the ordinary phthalocyanine pigments and is not an adequate solution to the problem.

The present invention depends on the production of salts of phthalocyanine by a very particular process. These salts may be hydrolyzed back to the phthalocyanine pigments which then show strong resistance to flocculation and do not have any of the disadvantages of the pigments which have been coated with foreign matter.

It has been known for a long time that phthalocyanine pigments are capable of forming salts with strong acids. The phthalocyanine pigment might be considered as a weak base, using this term in its theoretical, physical chemical significance, of a proton acceptor. The term is not used to mean a product which ionizes readily in water and gives a pH materially above neutral. There are eight nitrogen atoms in the phthalocyanine molecule, and therefore, it may be considered to behave against strong acids as an octavalent base.

In the past, salts of phthalocyanine pigments have been produced by treating the pigment, after isolation and purification with concentrated aqueous acid or with acid in the absence of inert organic diluents. When these salts are hydrolyzed, the resulting pigments are not flocculation resistant to a sufficient degree to make them satisfactorily useful in practice.

The process of the present invention involves treating a phthalocyanine pigment in an inert organic liquid with a fairly strong, non-oxidizing acid. The particular acid is not critical so long as it reacts with the phthalocyanine and it may be used in varying amounts to produce salts having from 1 to 8 acid equivalents per molecule of phthalocyanine pigment. Best results are obtained with sulfuric acid, hydrogen chloride, hydrogen bromide, aliphatic sulfuric esters having an organic radical not more than 6 carbon atoms, aromatic sulfonic acids of the benzene and naphthalene series and aliphatic sulfonic acids in which the organic radical contains not more than 6 carbon atoms. These, therefore, constitute the preferred acids of the present invention which is more particularly concerned with their use. The reaction proceeds under substantially anhydrous conditions and it is apparent that the salts produced are different in nature from those obtained by reacting phthalocyanines with concentrated aqueous acids or with acids in the absence of an organic diluent liquid. Just what the nature of this difference is has not been determined. It may be a chemical difference throughout the whole of a pigment particle or it may be a physical difference at the surface. It is not intended to limit the present invention to any theory of just what the difference is. However, when the new salts of the present invention are hydrolyzed, pigments are produced which are strongly resistant to flocculation and which, therefore, open new fields of utility in coating compositions to the phthalocyanine pigments. The advantages of flocculation resistance are obtained without introducing any foreign matter into the pigment and by a process which is economical and can be operated smoothly.

The nature of the phthalocyanine pigment to be subjected to the process of the present invention may vary widely. It is an advantage of the invention that the common phthalocyanine pigments such as the copper, zinc, cobalt, nickel, and metal-free phthalocyanine may serve as raw materials. In addition to phthalocyanine itself and its metal compounds, derivatives may be used such as tetranaphtho tetraazaporphines, alkyl and aryl derivatives of phthalocyanine, and halogenated phthalocyanines, tetraazaporphines with fused heterocyclic rings and the like. It is an advantage of the invention that the physical form of the phthalocyanine is unimportant and so is its chemical purity. As will be described in more detail below, the process of the present invention is applicable to crude pigments or even to the reaction mixture in which the crude pigments are produced. The elimination of elaborate purification and isolation of the phthalocyanine pigments before treatment by the present invention is a marked economic advantage of the present invention, permitting substantial reductions in cost.

The acids used for salt formation cover a wide range of strong acids which are not strong oxidizers. They include the strong, non-oxidizing mineral acids such as sulfuric acid, hydrogen chloride and hydrogen bromide, aromatic sulfonic acids such as benzene sulfonic acid, the toluene sulfonic acids, the xylene sulfonic acids, and the naphthalene sulfonic acids. Aliphatic sulfonic acids are also useful, particularly when the carbon chain does not contain more than six carbon atoms. Typical examples are methane sulfonic acid, ethane sulfonic acid, isethionic acid, and the like. Higher molecular weight aliphatic sulfonic acids may also be used, but are less desirable. Another class of strong organic acids are the sulfuric acid half esters, such as methyl sulfuric acid, ethyl sulfuric acid, and the like. It is obvious that mixtures of these acids may be used and in some cases it is more economical to use mixtures. These mixed acids are included in the invention and it should be understood that when the acids are referred to, mixtures are included.

As has been pointed out above, the phthalocyanine molecule is capable of combining with from 1 to 8 equivalents of acid. It is possible to use more acid, but an excess does not aid the reaction and merely constitutes an unnecessary waste. The process, however, is perfectly operative with an excess and it is, therefore, not intended to limit the present invention to any rigid range of stoichiometrical proportions of acid and phthalocyanine.

Practically any inert organic liquid may be used as the reaction medium. Thus, for instance, the liquid may be a hydrocarbon, a mono or poly halogenated hydrocarbon, a nitro compound, an ether, an ester, a ketone or the like. Organic acids may also be used where they are sufficiently inert. Typical organic liquids are benzene, toluene, xylene, mono, di and trichlorobenzene, chloroform, trichloroethylene, mononitrobenzene, aliphatic nitro compounds, such as nitromethane, ethane, and propane, glacial acetic acid, etc.

While the organic liquid may vary widely, it is necessary that it have some solvent action on the acid used and, of course, the inertness of the organic liquid applies both to the phthalocyanine and to the acid. Thus, if the organic liquid is a stronger proton acceptor than the phthalocyanine, the acid will form a salt with the liquid rather than with the pigment.

It is an advantage of the present invention that the amount of liquid to be used as a reaction medium is not unduly critical. There is, of course, a practical lower limit as in any reaction which is to be carried out in an organic liquid, namely that there should be enough liquid so that the mixture can be readily stirred. This constitutes the practical lower limit which, naturally, varies somewhat depending on the particular liquid use. In general, amounts of liquid from five to ten parts per part of pigment will give easily stirred mixtures. Larger amounts of liquid do not do any particular harm, but as they constitute an economic waste, it is normally undesirable to go beyond the amount of liquid which produces an easily stirrable medium.

It is desirable to allow the pigment sufficient time to react with the acid so that conversion to the desired salt is substantially complete. As the phthalocyanine molecule is not a very strong proton acceptor, reaction is not instantaneous. Typically, times in the range from a few minutes to several hours are suitable. Excessive reaction time is undesirable because it serves no useful purpose and may adversely affect the pigment, reducing its maximum strength. Since the reaction proceeds between a solid and a liquid phase, agitation is desirable in order to produce good contact and in general moderate agitation should be maintained throughout the reaction.

The salt formation takes place over a wide range of temperatures. However, high temperatures do not give any better results than room temperature and with some liquids may result in inferior physical pigment characteristics when the salts are later hydrolyzed. It is, therefore, preferred to operate at or near room temperature although the invention is not strictly limited thereto.

Recovery of the salts is a simple matter and the ordinary means, such as filtration, decantation and the like are employed. The particular method of isolation forms no part of the present invention. It is not even necessary to isolate the salt before hydrolysis and it is, therefore, possible to carry out all the steps of the process of the present invention in a single reaction medium which represents a further practical advantage of the present invention.

The step of hydrolysis which must be employed if it is desired to regenerate the phthalocyanine pigment involves reaction with a proton acceptor which is a stronger proton acceptor than the phthalocyanine pigment so that it removes the acid and thus hydrolyzes the salt. Typical proton acceptors are water, alcohols, nitrogen bases, such as ammonia, pyridine, dimethyl aniline, quinolines, trimethylamine, morpholine and aniline. Preferably, such bases are used in conjunction with lower aliphatic alcohols such as methanol or ethanol. The isolation of the hydrolyzed pigment is effected by conventional means.

In addition to the production of flocculation resistant phthalocyanines when the salts are hydrolyzed, the process of the present invention has other advantages. For example, salts may be made of sensitive phthalocyanines such as metal-free phthalocyanines which are partly or wholly destroyed by the known methods of salt formation.

Another advantage in this process is the great ease and versatility with which it may be applied on a technical scale. For instance, isolation of the crude pigment from the reaction mixture in which it was prepared is unnecessary. The proper acid may be added directly thereto and the corresponding salt isolated directly, or the salt may be formed and then hydrolyzed and the conditioned pigment isolated. In the customary methods for salt formation, the crude pigment must be freed from the solvent in which it was made by filtration, followed by steam stripping, after which it must be dried. The dried product is then treated with acid. The advantages of the new process are obvious. There is made available a one-step process with the elimination of many laborious steps.

The invention will be described in greater detail by the following examples although it is not intended to limit in any way the scope of application of the method of the invention. All parts are by weight.

*Example 1*

Thirty parts of crude copper phthalocyanine (obtained by the method of U. S. P. 2,318,787) and 38 parts of xylene sulfonic acid (prepared by adding 22 parts of xylene to 23 parts of 98% sulfuric acid at 70°–80° C.) were added to 300 parts of nitrobenzene. The mixture was stirred for two hours. During this period, the large coarse crystals of pigment were converted to the salt of pigment having a microcrystalline structure. The reaction mixture was then diluted with ethyl alcohol to hydrolyze the acid salt and the mixture filtered. The cake was washed with alcohol and dried.

The resulting pigment, when ground on an ink mill with lithographic varnish, developed easily into a smooth color paste possessing excellent texture, jet masstone, bright tint-tone, and high tinctorial strength. When formulated into a nitrocellulose lacquer, the pigment showed good flocculation resistance.

Essentially the same results are obtained if, after hydrolysis, the pigment is isolated by filtration, followed by steaming of the filter cake to remove the organic solvent.

Equally excellent results may also be obtained if methyl or isopropyl alcohols are used for ethanol in the hydrolysis.

*Example 2*

5.76 parts of dry, acid-pasted copper phthalocyanine was added to a solution of 0.98 part of sulfuric acid monohydrate in 200 parts of nitrobenzene. The mixture was stirred at 25°–30° C. for 10 hours.

The green slurry of the pigment salt which formed was filtered and the filter cake washed with 250 parts of nitrobenzene in small portions. The cake was then washed with alcohol to hydrolyze the salt and the resulting pigment washed with water until acid-free. The pigment was dried at 60°–65° C.

Pigment so treated has properties similar to those of the product of Example 1.

*Example 3*

5.76 parts of dry, acid-pasted copper phthalocyanine was added to a solution of 3.92 parts of sulfuric acid monohydrate in 200 parts of nitrobenzene. The mixture was stirred at 25°–30° C. for 10 hours.

The green slurry of the pigment salt which formed was filtered and the cake washed with nitrobenzene, alcohol and water. The pigment was dried at 60°–65° C.

Pigment so treated has properties similar to those of the product of Example 1.

*Example 4*

Thirty parts of crude copper phthalocyanine and 114 parts of xylene sulfonic acid (prepared by adding 22 parts of xylene to 23 parts of 98% sulfuric acid at 70°–80° C.) were added to 300 parts of nitrobenzene. The mixture was stirred for two hours. The reaction mixture was then treated with alcohol to hydrolyze the acid salt and the pigment isolated as described in Example 1.

The pigment so obtained was comparable in properties to that of Example 1.

Similar results are obtained if benzene, toluene, or naphthalene sulfonic acid is used instead of xylene sulfonic acid.

Example 5

Thirty parts of copper phthalocyanine and 38 parts of xylene sulfonic acid (prepared by adding 22 parts of xylene to 23 parts of 98% sulfuric acid at 70°–80° C.) were added to 300 parts of ortho-dichlorobenzene. The mixture was stirred for two hours, the pigment salt hydrolyzed and the resulting pigment isolated as described in Example 1.

The pigmentary characteristics of the product so produced were similar to those of the product of Example 1.

Example 6

Thirty parts of copper phthalocyanine and 20 parts of sulfuric acid monohydrate were added to 300 parts of nitrobenzene. The mixture was stirred for two hours, the pigment salt hydrolyzed and the resulting pigment isolated as described in Example 1.

Similar results are obtained if phosphoric acid is substituted for sulfuric acid as the acid for the formation of the salt.

Example 7

Thirty-five parts of crude zinc phthalocyanine and 76 parts of xylene sulfonic acid (prepared by adding 22 parts of xylene to 23 parts of 98% sulfuric acid at 70°–80° C.) were added to 300 parts of nitrobenzene. The mixture was stirred for two hours, after which it was diluted with 300 parts of ethyl alcohol in order to hydrolyze the pigment salt. The pigment was separated by filtration and washed with alcohol. After drying, a soft pigment powder was obtained with properties similar to those of the product of Example 1.

Similar results are obtained if cobalt, nickel, or metal-free phthalocyanines are used instead of zinc phthalocyanine.

Example 8

Thirty parts of crude copper phthalocyanine was added to 300 cc. of toluene. Dry hydrogen chloride gas was passed into the stirred mixture until the large coarse crystals of pigment were converted into the acid salt having a microcrystalline structure. The acid salt was hydrolyzed with ethyl alcohol and the pigment isolated as described in Example 1.

The properties of the pigment so treated are similar to those of the product of Example 1.

Similar results are obtained if benzene, toluene, nitrobenzene or acetic acid are used as the reaction medium.

Example 9

5.76 parts of dry, acid-pasted copper phthalocyanine was added to a solution of 2.2 parts of dry hydrogen chloride gas in 300 parts of nitrobenzene. The mixture was stirred at 25°–30° C. for 10 hours.

The green slurry of the pigment salt which formed was filtered and the cake washed with nitrobenzene, alcohol and water. The pigment so obtained was dried at 60°–65° C.

Pigment so treated has properties similar to those of the product of Example 1.

Example 10

5.76 parts of copper phthalocyanine was added to a solution of 10 parts of ethyl sulfuric acid in 50 parts of nitrobenzene. The mixture is stirred at 25°–30° C. for one hour.

The green slurry of salt which formed was filtered and the cake washed with nitrobenzene, alcohol and water. The cake was dried at 60°–65° C.

Pigment so treated has properties similar to those of the product of Example 1.

Similar results are obtained if isethionic acid is used in place of the ethyl sulfuric acid.

Example 11

5.76 parts of copper phthalocyanine was slurried in 100 parts of mononitrobenzene.

95 parts of mononitrobenzene containing 7.88 parts of 100% sulfuric acid was added and the mixture stirred for five hours. It was then filtered and the residue washed with mononitrobenzene. Analysis of the residue shows that it contained 7.98 moles of sulfuric acid per mole of pigment.

Example 12

Twenty parts of crude copper phthalocyanine was added to 200 parts of nitrobenzene. To this slurry was added a solution of 27.5 parts of sulfuric acid monohydrate in 50 parts of nitrobenzene. The mixture was stirred at 10°–15° C. for two hours.

The green slurry was diluted with 200 parts of methanol which had been saturated with ammonia gas, filtered and the cake washed acid-free with methanol. The cake was then washed with water and dried.

The properties of the pigment so treated are similar to those of the product of Example 1.

Example 13

Twenty parts of crude copper phthalocyanine was added to 200 parts of nitrobenzene. To this slurry was added a solution of 27.5 parts of sulfuric acid monohydrate in 50 parts of nitrobenzene. The mixture was stirred at 15°–20° C. for two hours.

The green slurry was diluted with 100 parts of pyridine, filtered, and the cake washed acid-free with methanol. The cake was then washed with water and dried.

The properties of the pigment so treated are similar to those of the product of Example 1.

Results similar to those described above are obtained if dimethylaniline or mixtures of pyridine and alcohol or dimethylaniline in methyl or ethyl alcohol are used in the hydrolysis of the acid salt.

We claim:

1. A method of preparing salts of sulfuric acid stable phthalocyanine pigments which comprises reacting the pigment with an acid selected from the group consisting of non-oxidizing, strong mineral acids, aliphatic sulfuric acid esters in which the organic radical contains not more than six carbon atoms, aromatic sulfonic acids of the benzene and naphthalene series, and aliphatic sulfonic acids in which the organic radical contains not more than six carbon atoms, the amount of the acid being at least stoichiometrically equivalent to the phthalocyanine pigment but small in comparison to the total volume of reaction media, the reaction taking place under substantially anhydrous conditions in an inert organic liquid having solvent action on the acid, and the amount of liquid being sufficient to produce a readily stirrable reaction mixture the amount of liquid being large compared to the amount of sulfuric acid.

2. A method according to claim 1 in which the phthalocyanine pigment is copper phthalocyanine.

3. A method according to claim 2 in which the organic liquid is nitrobenzene.

4. A method according to claim 3 in which the acid is sulfuric acid.

5. A method according to claim 1 in which the salt is hydrolyzed by exposure to a stronger proton acceptor than the pigment.

6. A method according to claim 5 in which the salt is hydrolyzed with alcohol.

7. A method according to claim 6 in which the copper phthalocyanine salt is hydrolyzed with an alcohol.

8. A method according to claim 1 in which a phthalocyanine pigment is copper phthalocyanine, the acid is sulfuric, the organic liquid is nitrobenzene and the salt is hydrolyzed with methyl alcohol.

9. A method according to claim 8 in which the methyl alcohol contains ammonia.

10. A method according to claim 8 in which the methyl alcohol contains pyridine.

11. A method according to claim 8 in which the methyl alcohol contains N,N-dimethylaniline.

HANS Z. LECHER.
ROBERT E. BROUILLARD.
VITO A. GIAMBALVO.

REFERENCES CITED

The following references are of record in the file of this patent:

UNITED STATES PATENTS

| Number | Name | Date |
|---|---|---|
| 291,452 | Dahlen et al. | July 28, 1942 |
| 2,359,737 | Lacey et al. | Oct. 10, 1944 |
| 2,375,120 | Loukomsky et al. | May 1, 1945 |